(12) United States Patent
Bruwer

(10) Patent No.: US 7,291,940 B2
(45) Date of Patent: Nov. 6, 2007

(54) PRESSURE SENSITIVE SWITCHES INCLUDING TOUCH SENSOR STRUCTURES

(75) Inventor: Frederick Johannes Bruwer, Paarl (ZA)

(73) Assignee: Azoteq Pty Ltd., Paarl (ZA)

( * ) Notice: Subject to any disclaimer, the term of this patent is extended or adjusted under 35 U.S.C. 154(b) by 498 days.

(21) Appl. No.: 10/875,618

(22) Filed: Jun. 25, 2004

(65) Prior Publication Data

US 2005/0083626 A1   Apr. 21, 2005

Related U.S. Application Data

(63) Continuation-in-part of application No. 09/806,860, filed as application No. PCT/ZA99/00107 on Oct. 8, 1999, which is a continuation-in-part of application No. 09/169,395, filed on Oct. 9, 1998, now Pat. No. 6,249,089.

(51) Int. Cl.
*H01H 3/26* (2006.01)
*H02H 3/00* (2006.01)

(52) U.S. Cl. ............... 307/140; 307/139; 307/137; 361/71; 361/67

(58) Field of Classification Search ........... 307/140, 307/139, 137, 125, 126, 130, 131; 361/71, 361/67, 68
See application file for complete search history.

(56) References Cited

U.S. PATENT DOCUMENTS

| 6,642,467 | B2 * | 11/2003 | Farringdon | 200/511 |
| 6,700,508 | B1 * | 3/2004 | Nomura et al. | 341/27 |
| 6,748,869 | B1 * | 6/2004 | Boyer et al. | 102/428 |

* cited by examiner

*Primary Examiner*—Tuyet Vo
(74) *Attorney, Agent, or Firm*—Jones, Tullar & Cooper, P.C.

(57) ABSTRACT

An electronic circuit for use with an exhaustible power source and at least one load such as a light bulb, a radio or motor, includes a microchip with an input that transmits a signal to the microchip when the load is activated or deactivated. The input does not form a serial link between the power source and the load. The power switch, by on/off switching, controls energy flow from the power source to the load. The input to the microchip acts as an activation/deactivation user interface. The microchip allows the user to select a specific load, specific functions for the selected load based on the time duration of activation signals, the time duration between activation signals and the number of activation signals at the input.

24 Claims, 11 Drawing Sheets

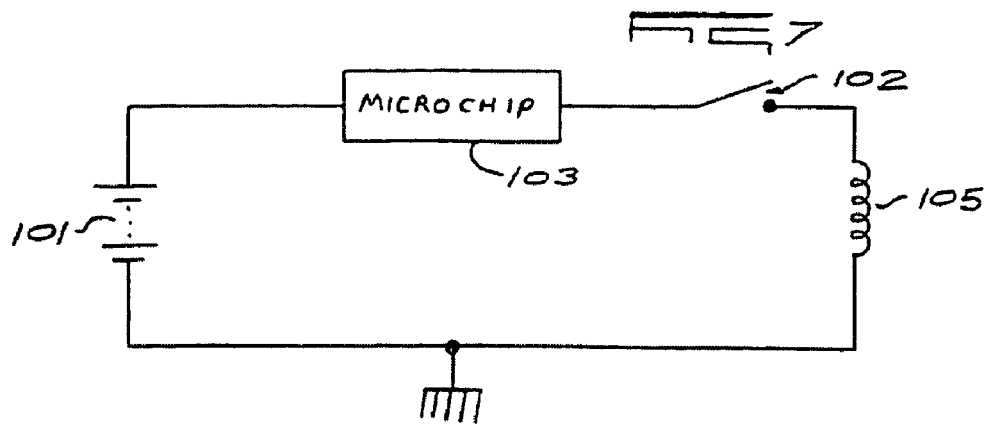
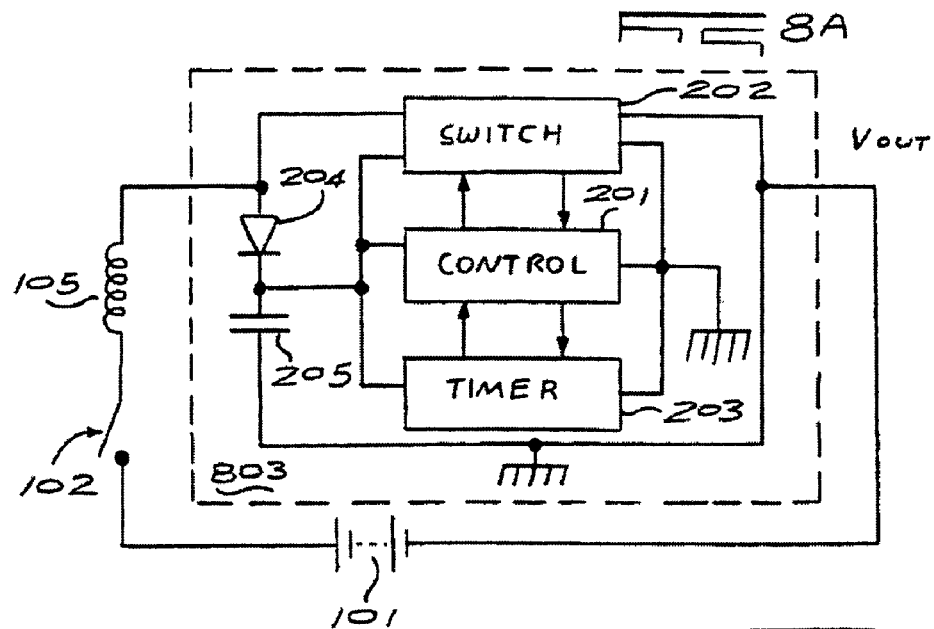
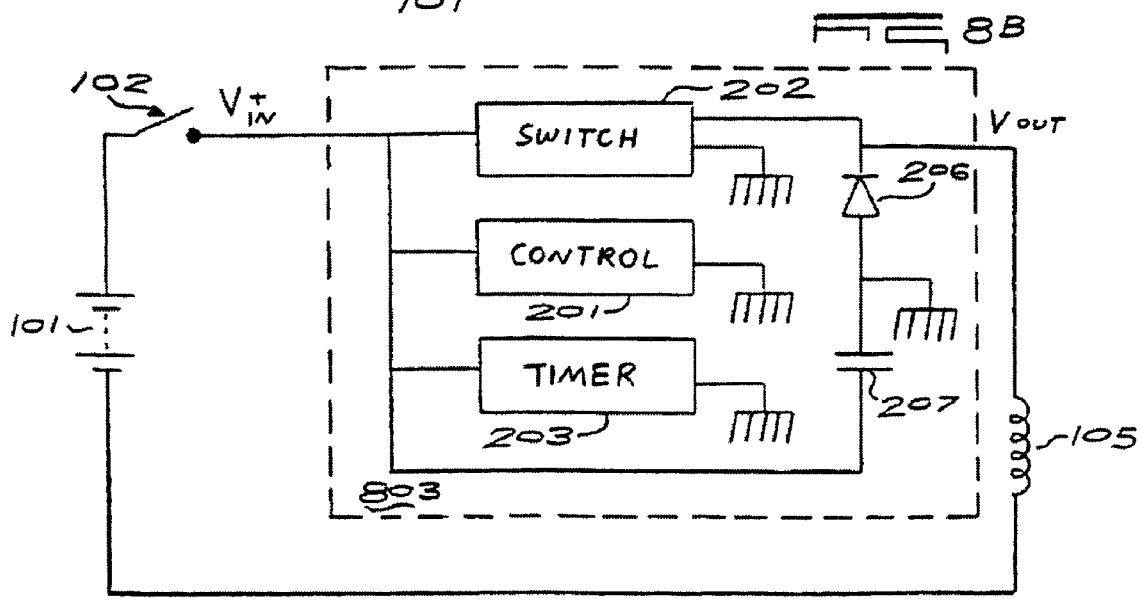

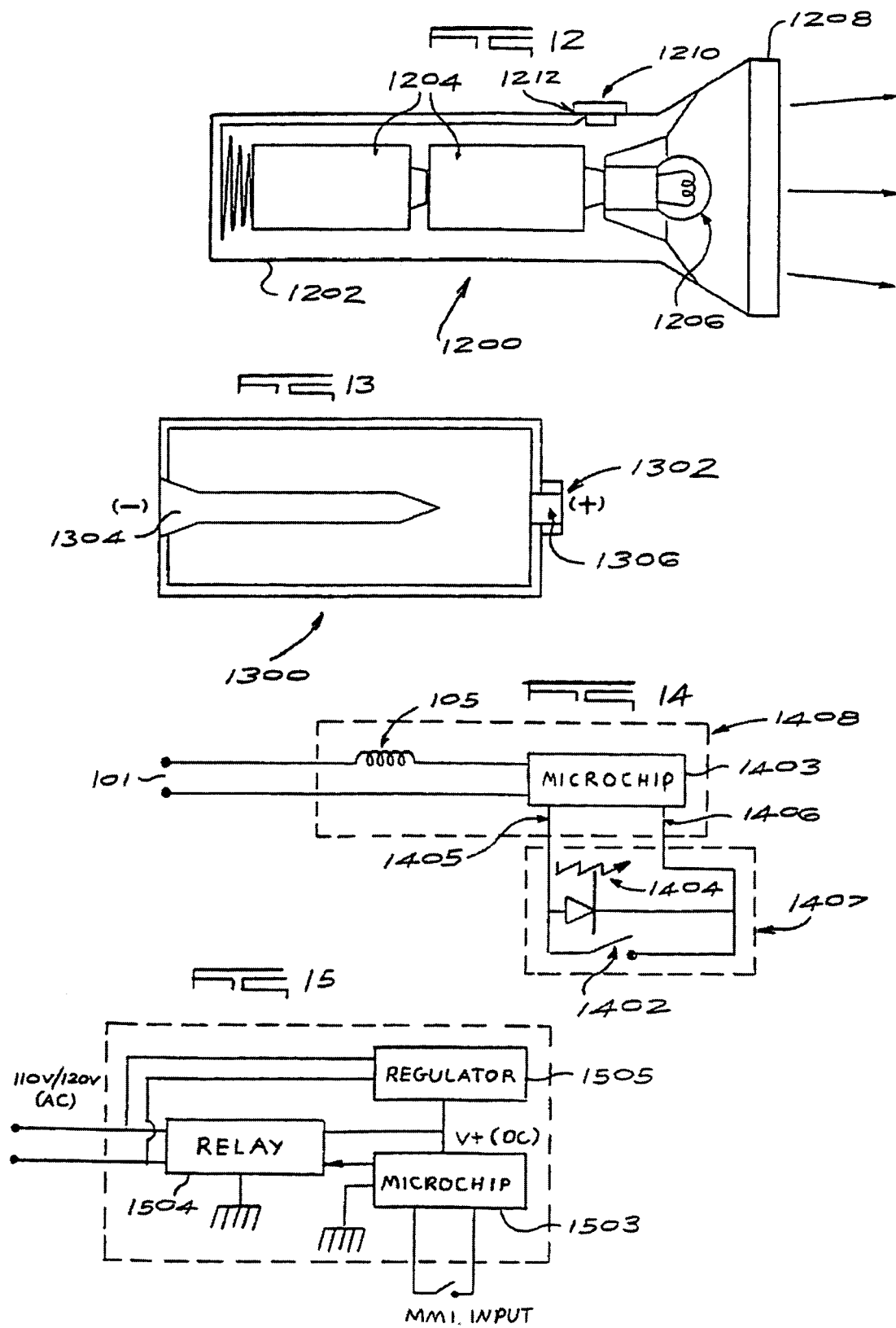

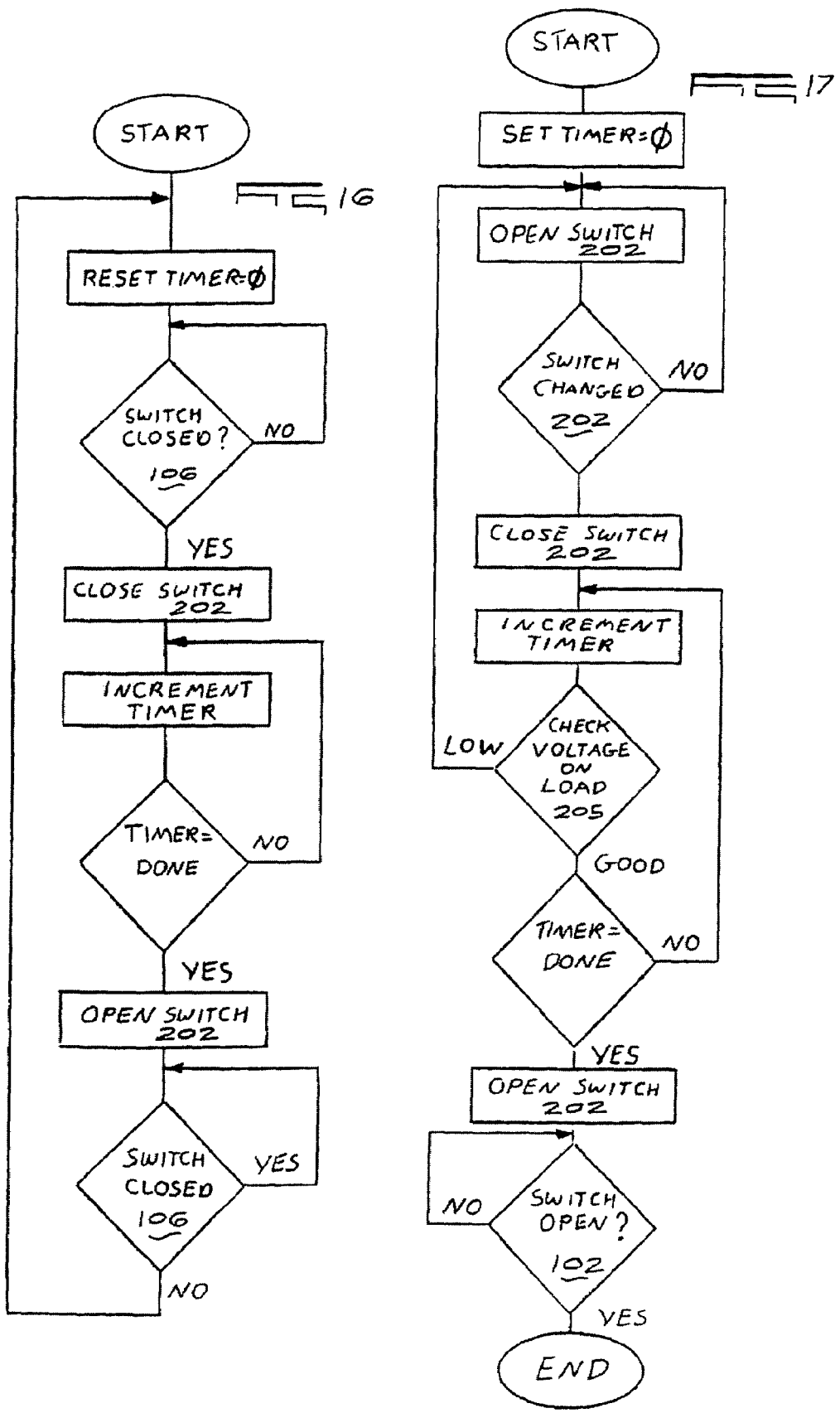

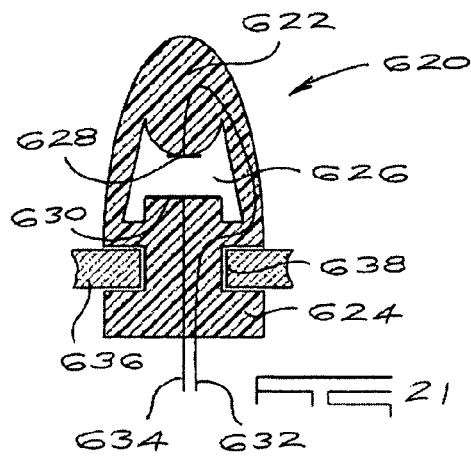
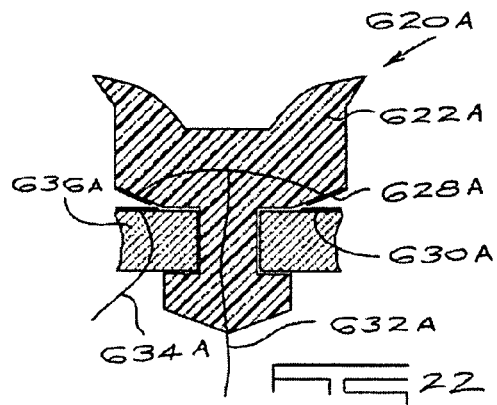
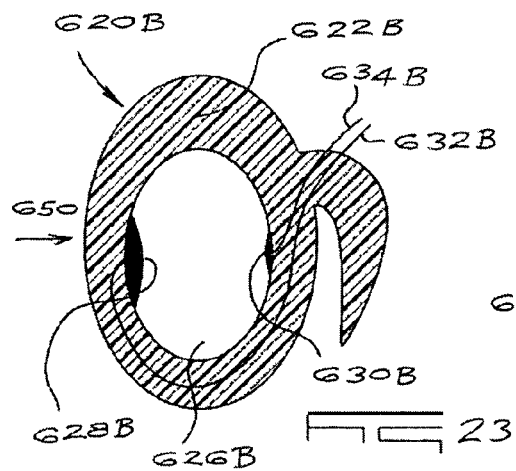
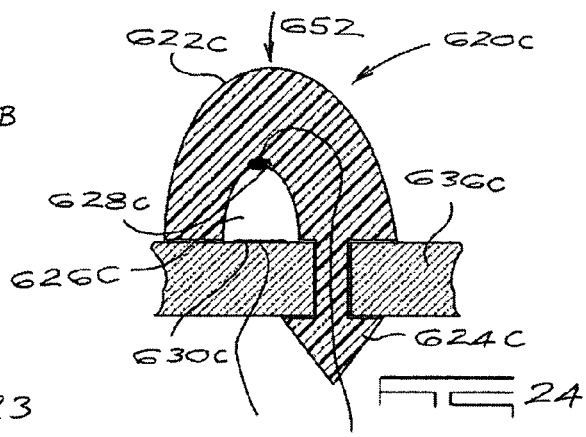
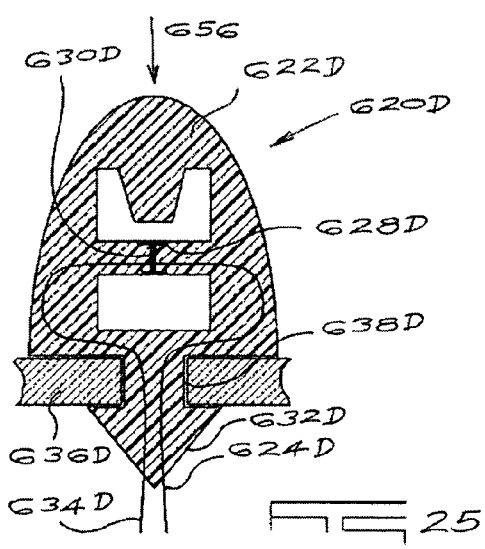
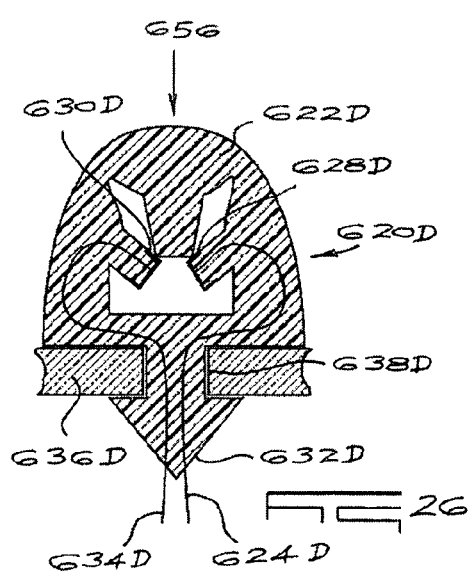

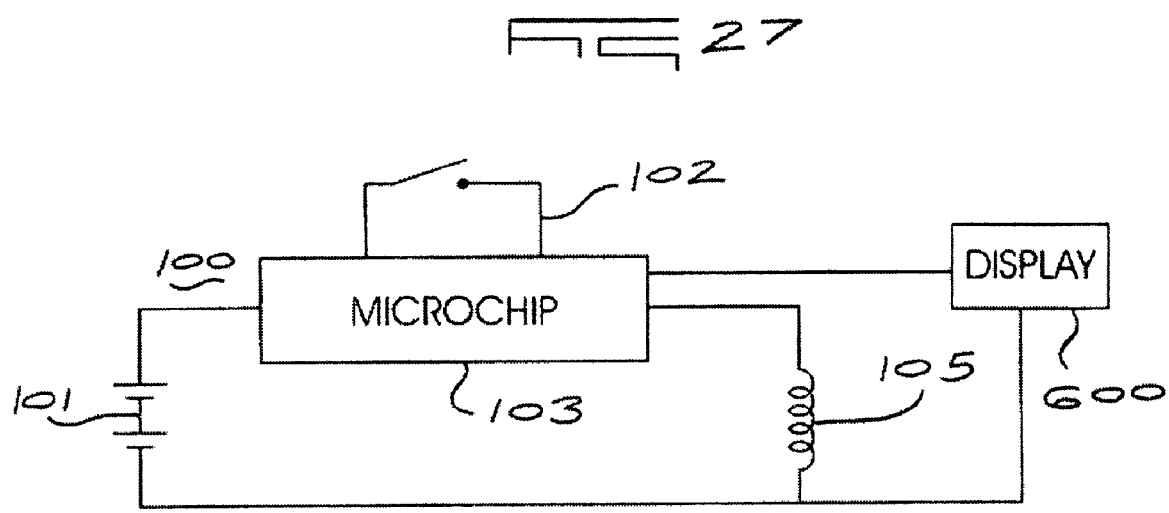

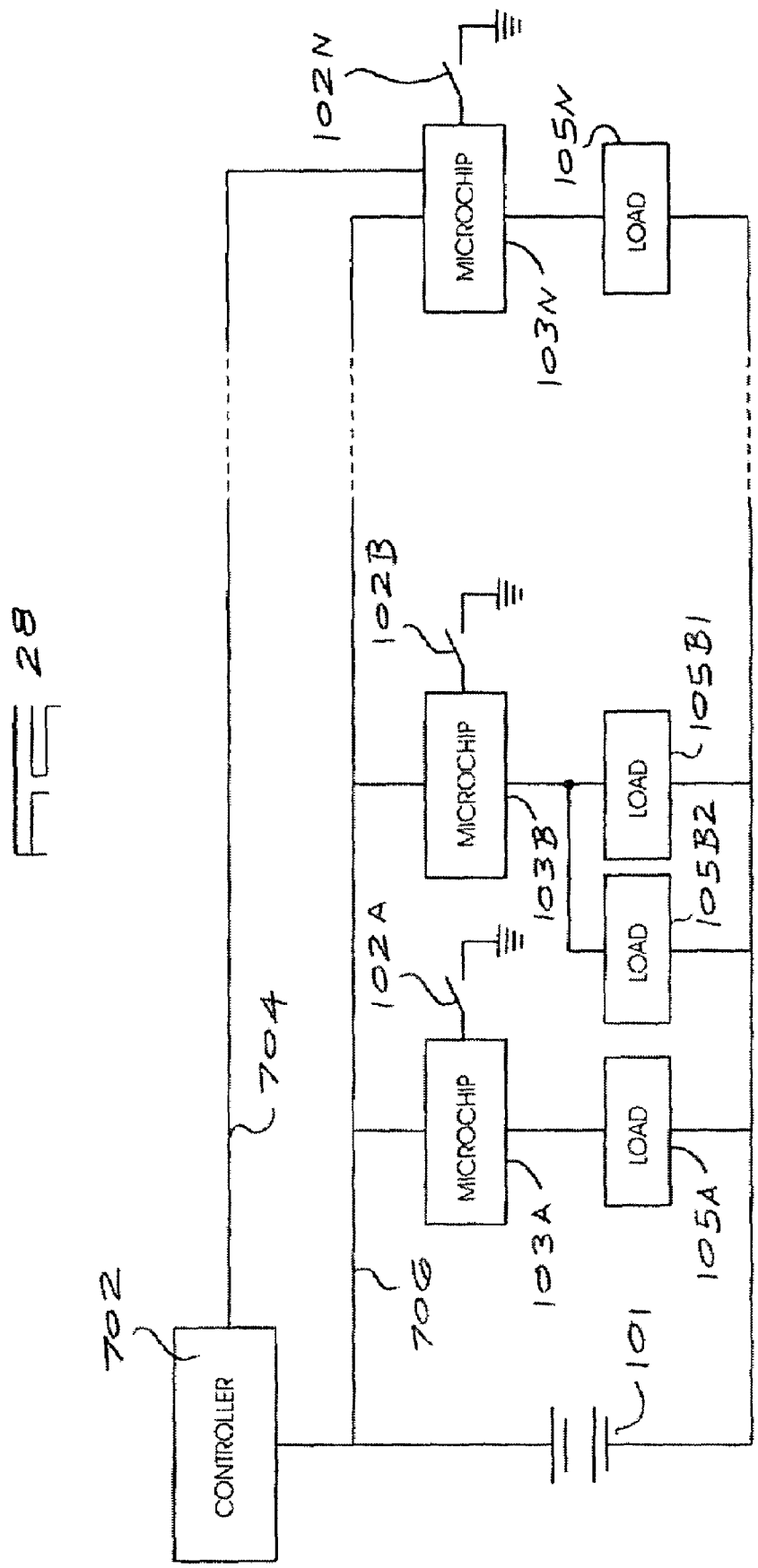

PRESSURE SENSITIVE SWITCHES INCLUDING TOUCH SENSOR STRUCTURES

CROSS REFERENCE TO RELATED APPLICATIONS

This application is a Continuation-in-Part of U.S. application Ser. No. 09/806,860, filed Jul. 2, 2001 now U.S. Pat. No. 6,984,900, which is a U.S. National Stage of International Application No. PCT/ZA99/00107, filed Oct. 8, 1999, which is a Continuation-in-Part of U.S. application Ser. No. 09/169,395, filed Oct. 9, 1998, now U.S. Pat. No. 6,249,089.

FIELD OF THE INVENTION

The present invention relates to new intelligent electrical current switching devices and more particularly, to microchip controlled electrical current switching devices. The invention further relates, in one embodiment, to intelligent batteries having embedded therein a microchip for use with a variety of electrical devices to add heretofore unknown functionality to existing electrical devices. The invention also relates, according to another embodiment, to intelligent hand-held electronic devices, and in a preferred embodiment to hand-held light sources, and more particularly, to flashlights. According to one embodiment of the present invention, the invention relates to intelligent hand-held flashlights having microchip controlled switches wherein said switches can be programmed to perform a variety of functions including, for example, turning the flashlight off after a pre-determined time interval, blinking, or dimming, etc. According to a still further embodiment, the invention relates to low current switches controlled by microchips of the present invention for use in building lighting systems.

The invention further relates to the use of the switching device in diverse applications to achieve a gradual or stepped reduction of power to a load, in combination with a reduced, temporarily fixed, supply of power to a load. Such implementations extend to lighting, typically in an interior of an automobile or other vehicle, or external or internal lighting in a building, to portable lighting products and to portable devices which include lights eg. flashlights, flashclips, dome lights etc. and to the supply of electrical energy to electrically powered or actuated mechanisms and devices such as heaters, seat warmers, electric motors in toys and other appliances, toothbrushes and shavers.

The invention also extends to physical aspects of, and to a method, relating to the construction of, the switching device and, more particularly, to very low current actuators, touch pads or switches to be used for actuating or controlling a microchip based switching arrangement.

BACKGROUND OF THE INVENTION

In conventional flashlights, manually-operated mechanical switches function to turn the flashlight "on" and "off." When turned "on," battery power is applied through the closed switch to a light bulb; the amount of power then consumed depends on how long the switch is closed. In the typical flashlight, the effective life of the battery is only a few hours at most. Should the operator, after using the flashlight to find his/her way in the dark or for any other purpose, then fail to turn it off, the batteries will, in a very short time, become exhausted. Should the flashlight be left in a turned-on and exhausted condition for a prolonged period, the batteries may then leak and exude corrosive electrolyte that is damaging to the contact which engages the battery terminal as well as the casing of the flashlight.

When the flashlight is designed for use by a young child the likelihood is greater that the flashlight will be mishandled, because a young child is prone to be careless and forgets to turn the flashlight "off" after it has served its purpose. Because of this, a flashlight may be left "on" for days, if not weeks, and as a result of internal corrosion may no longer be in working order when the exhausted batteries are replaced.

Flashlights designed for young children are sometimes in a lantern format, with a casing made of strong plastic material that is virtually unbreakable, the light bulb being mounted within a reflector at the front end of the casing and being covered by a lens from which a light beam is projected. A U-shaped handle is attached to the upper end of the casing, with mechanical on-off slide switch being mounted on the handle, so that a child grasping the handle can readily manipulate the slide actuator with his/her thumb.

With a switch of this type on top of a flashlight handle, when the slide actuator is pushed forward by the thumb, the switch "mechanically" closes the circuit and the flashlight is turned "on" and remains "on" until the slide actuator is pulled back to the "off" position and the circuit is opened. It is this type of switch in the hands of a child that is most likely to be inadvertently left "on."

To avoid this problem, many flashlights include, in addition to a slide switch, a push button switch which keeps the flashlight turned on only when finger pressure is applied to the push button. It is difficult for a young child who wishes, say to illuminate a dark corner in the basement of his home for about 30 seconds, to keep a push button depressed for this period. It is therefore more likely that the child will actuate the slide switch to its permanently-on position, for this requires only a monetary finger motion.

It is known to provide a flashlight with a delayed action switch which automatically turns off after a pre-determined interval. The Mallory U.S. Pat. No. 3,535,282 discloses a flashlight that is automatically turned off by a delayed action mechanical switch assembly that includes a compression spring housed in a bellows having a leaky valve, so that when a switch is turned on manually, this action serves to mechanically compress the bellows which after a pre-determined interval acts to turn off the switch.

A similar delayed action is obtained in a flashlight for children marketed by Playskool Company, this delayed action being realized by a resistance-capacitance timing network which applies a bias to a solid-state transistor switch after 30 seconds or so to cut off the transistor and shut off the flashlight. Also included in the prior art, is a flashlight previously sold by Fisher-Price using an electronic timing circuit to simply turn off the flashlight after about 20 minutes.

It is also known, e.g. as disclosed in U.S. Pat. No. 4,875,147, to provide a mechanical switch assembly for a flashlight which includes a suction cup as a delayed action element whereby the flashlight, when momentarily actuated by an operator, functions to connect a battery power supply to a light bulb, and which maintains this connection for a pre-determined interval determined by the memory characteristics of the suction cup, after which the connection is automatically broken.

U.S. Pat. No. 5,138,538 discloses a flashlight having the usual components of a battery, and on-off mechanical switch, a bulb, and a hand-held housing, to which there is added a timing means and a circuit-breaking means responsive to the timing means for cutting off the flow of current to the bulb, which further has a by-pass means, preferably child-proof, to direct electric current to the light bulb regardless of the state of the timing means. The patent also provides for the operation of the device may be further enhanced by making the by-pass means a mechanical switch connected so as to leave it in series with the mechanical on-off switch. Furthermore, the patent discloses a lock or other "child-proofing" mechanism may be provided to ensure that the by-pass is disabled when the flashlight is switched off.

Most conventional flashlights, like those described above, are actuated by mechanical push or slide button-type switches requiring, of course, mechanical implementation by an operator. Over time, the switch suffers "wear and tear" which impairs operation of the flashlight as a result of, for example, repeated activations by the operator and/or due to the fact that the switch has been left "on" for a prolonged period of time. In addition, such mechanical switches are vulnerable to the effects of corrosion and oxidation and can cause said switches to deteriorate and to become non-functioning. In addition, these prior art devices having these mechanical switches are generally "dumb," i.e. they do not provide the user with convenient, reliable, and affordable functionalities which today's consumers now demand and expect.

The prior art switches typically provide two basic functions in prior art flashlights. First, the mechanical switches act as actual conductors for completing power circuits and providing current during operation of the devices. Depending upon the type of bulb and wiring employed, the intensity of electrical current which must be conducted by the switch is generally quite high leading to, after prolonged use, failure. Second, these mechanical switches must function as an interface between the device and its operator, i.e. the man-machine-interface ("MMI") and necessarily requires repeated mechanical activations of the switch which over time mechanically deteriorate.

Also, currently the electrical switches used in buildings/ houses for control of lighting systems are of the conventional type of switches which must conduct, i.e. close the circuit, upon command, thus also providing the MMI. These prior art switches suffer from the same disadvantages as the switches described above in relation to portable electronic devices, like flashlights. Moreover, the switches are relatively dumb in most cases and do not provide the user with a variety of functions, e.g. but not limited to timing means to enable a user, for example, a shop owner or home owner to designate a predetermined shut off or turn on point in time.

There is a need for inexpensive, reliable, and simple intelligent electronic devices which provide increased functionality and energy conservation.

SUMMARY OF THE INVENTION

According to one embodiment of the present invention, there is provided a microchip controlled switch to manage both the current conducting functions and the MMI functions in an electronic device, such as a flashlight, on a low current basis i.e. without the MMI device having to conduct or switch high current. According to one aspect of the invention, the MMI functions are controlled by very low current signals, using touch pads, or carbon coated membrane type switches. These low current signal switches of the present invention can be smaller, more reliable, less costly, easier to seal and less vulnerable to the effects of corrosion and oxidation. Moreover, since the switch is a solid state component, it is, according to the present invention, possible to control the functions of the device in an intelligent manner by the same microchip which provides the MMI functions. Thus, by practicing the teachings of the present invention, more reliable, intelligent, and efficient electrical devices can be obtained which are cheaper and easier to manufacture than prior art devices.

According to another embodiment of the invention, there is provided a microchip which can be embedded in a battery that will lend intelligence to the battery and thus, the device it is inserted into, so that many functions, including but not limited to, delayed switching, dimming, automatic shut off, and intermittent activation may be inexpensively realized in an existing (non intelligent) product, for example a prior art flashlight.

According to a further embodiment, the invention provides a power saving microchip which, when operatively associated with an electronic device, will adjust the average electric current through a current switch, provide an on and off sequence which, for example, but not limited to, in the case of a flashlight, can be determined by an operator and may represent either a flash code sequence or a simple on/off oscillation, provide an indication of battery strength, and/or provide a gradual oscillating current flow to lengthen the life of the operating switch and the power source.

According to one embodiment of the invention, an intelligent flashlight, having a microchip controlled switch is provided comprising a microchip for controlling the on/off function and at least one other function of the flashlight. According to a further embodiment of the invention, an intelligent flashlight having a microchip controlled switch is provided comprising an input means for sending activating/deactivating signals to the microchip, and a microchip for controlling the on/off function and at least one other function of the flashlight. According to a further embodiment of the invention, there is provided an intelligent flashlight having a microchip controlled switch comprising an input means for selecting one function of the flashlight, a microchip for controlling at least the on/off function and one other function of the flashlight, wherein the microchip control circuit may further comprise a control-reset means, a clock means, a current switch, and/or any one or combination of the same.

According to another embodiment of the invention, there is provided a battery for use with an electrical device comprising a microchip embedded in the battery. According to still a further embodiment of the invention, a battery for use with an electronic device is provided comprising a microchip embedded in the battery wherein said microchip is adapted such that an input means external to the microchip can select the on/off function and at least one other function of the electronic device.

According to one embodiment of the present invention, there is provided an intelligent battery for use with an electronic device, the battery having positive and negative terminal ends and comprising a microchip embedded in the battery, preferably in the positive terminal end, for controlling on/off functions and at least one other function of the electronic device.

According to another embodiment of the invention, there is provided a portable microchip device for use in serial connection with a power source, e.g. an exhaustible power source, and an electronic device powered by said source wherein said electronic device has an input means for activating and deactivating said power source, and said microchip comprising a means for controlling the on/off function and at least one other function of the electronic device upon receipt of a signal from said input means through said power source.

According to a still further embodiment of the invention, there is provided a microchip adapted to control lighting in buildings. According to this embodiment, the normal switch on the wall that currently functions as both a power-switch, i.e. conduction of electricity, and MMI can be eliminated, thus eliminating the normal high voltage and high current dangerous wiring to the switch and from the switch to the load or light. Utilizing the present invention, these switches can be replaced with connecting means suitable for low current DC requirements.

According to another embodiment, the present invention is directed to a battery comprising an energy storage section, a processor, e.g. a microchip and first and second terminal ends. The first terminal end being connected to the energy storage section, the second terminal end being connected to the processor, and the processor being connected to the second terminal end and the energy storage section. The processor controls the connection of the second terminal end to the energy storage section.

According to another embodiment, the present invention provides an electronic apparatus which includes an electrical device, comprising a power supply, an activating/deactivating means, and a processor. The activating/deactivating means is connected to the processor and the processor is connected to the power supply. The processor controls the on/off function of the device and at least one other function of the device in response to signals received from the activation/deactivation means.

The present invention, according to a still further embodiment, provides a flashlight comprising a light source, an energy storage means, a switch means, and a processor means. The switch means being in communication with the processor means and the processor means being in communication with the energy storage means which is ultimately in communication with the light source. The processor controls the activation/deactivation of the light source and, in some embodiments, further functions of the flashlight, in response to signals received from the switch means.

While the present invention is primarily described in this application with respect to either a flashlight or a battery therefore, the embodiments discussed herein should not be considered limitative of the invention, and many other variations of the use of the intelligent devices of the present invention will be obvious to one of ordinary skill in the art.

BRIEF DESCRIPTION OF THE DRAWINGS

FIG. 7 is a schematic of a battery having embedded therein a microchip according to a further embodiment of the invention;

FIG. 8A is a block diagram of a microchip for use in a battery according to one embodiment of the present invention;

FIG. 8B is a block diagram of a second type of microchip for use in a battery according to another embodiment of the present invention;

FIG. 12 is a schematic of a flashlight having therein a microchip controlled switch according to one embodiment of the present invention;

FIG. 13 illustrates a possible position, according to one embodiment of the present invention of a microchip in a battery;

FIG. 14 is a schematic of one embodiment of the present invention of a low current switching device suitable for lighting systems in buildings;

FIG. 15 is a block diagram of one embodiment of the present invention, i.e. microchip 1403 of FIG. 14;

FIG. 16 is a flow diagram for a microchip as shown in FIGS. 4 and 5 for a delayed shut off function embodiment of one embodiment of the present invention;

FIG. 17 is a flow diagram for a microchip for a delayed shut-off function embodiment of the present invention;

FIG. 21 to 26 respectively depict different possible operating or actuating interfaces i.e. very low current control switches, used for controlling the microchip based switch of the invention;

FIG. 27 illustrates a modification of the circuit shown in FIG. 3;

FIG. 28 shows a switching system which uses a plurality of the switches and interfaces of the invention.

DETAILED DESCRIPTION OF THE INVENTION

Figure 1:
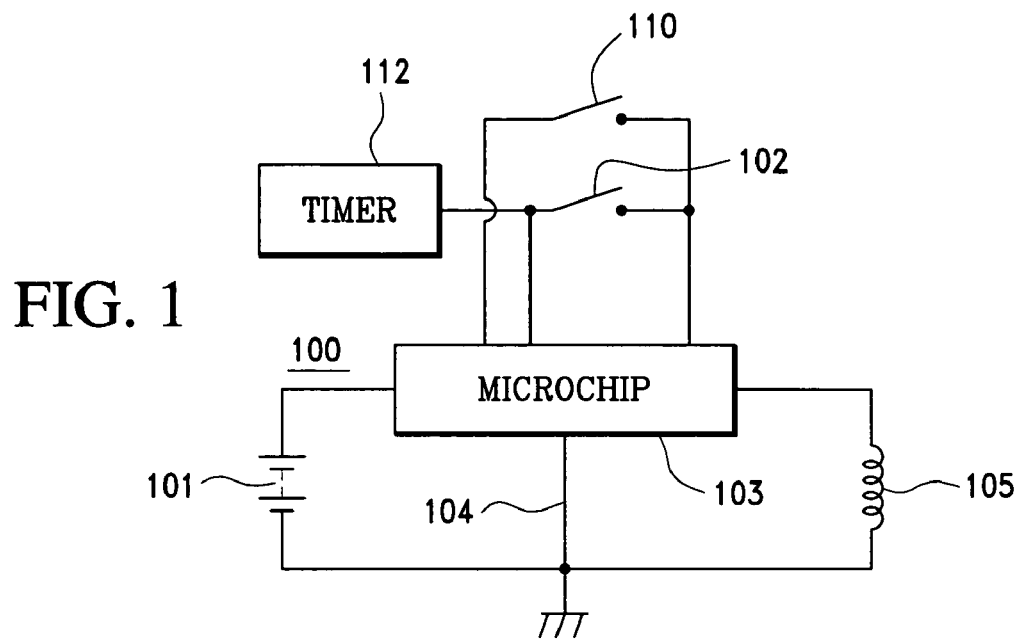
FIG. 1 is a schematic of a device having a microchip controlled push button or sliding type input activation/deactivation switch according to one embodiment of the present invention.

According to one embodiment or aspect of the present invention, and referring to FIG. 1, a schematic depiction of main circuit 100 of an electronic device, for example, a flashlight, is provided, wherein the device has a microchip 103 and a microchip controlled input activator/deactivator 102, for example, a push button or sliding switch. Main circuit 100 of the device is powered by a current supplied by power source 101. Power source 101 may be any power source, e.g. a DC battery, as is well known to those of ordinary skill in the art. While the following discussion is limited to specific electronic devices, that is flashlights, it is to be understood that the following description is equally applicable to other electronic devices including portable radios, toys, for example but not limited to battery operated cars, boats, planes, and/or other electrically powered toys.

Referring to FIG. 1, when an operator activates input push button or sliding command switch 102 to the "on" position, the microchip 103 receives a signal. Switch 102 is a direct electrical input to microchip 103. Microchip 103 is grounded by grounding means 104. Microchip 103 is in series between power source 101 and load 105. Microchip 103 also transfers sufficient power through means of a current switch (not shown in FIG. 1) to load 105 which can be, for example, a resistor-type bulb in the case of a flashlight to provide illumination.

The microchip 103, and other microchips of the present invention, can have its/their intelligence embedded in combinational or sequential logic, a PLA or ROM type structure feeding into a state machine or a true microcontroller type structure. The memory for the above will normally be non-volatile, but should there be a need for selectable options, EE or flash memory structures may be used.

The structure and operational parameters of such a microchip 103 are explained in greater detail below with respect to FIG. 2. As shown in FIG. 1, power is supplied to microchip 103 by power source 101. When an operator activates input switch 102 to the "on" position it represents a command which is communicated to microchip 103. Input means 102 requires very low current in preferred embodiments. In one embodiment of the invention, microchip control/reset means 201 simply allows the current switch 202 to pass current provided from power source 101 to load 105 in an unimpeded manner when the MMI switch 102 is activated, and, in the case of a flashlight, illumination is obtained. It is important to recognize, however, that it is control circuit 201 which activates current switch 202 upon acting on an input from MMI switch 102. Unlike heretofore known prior art devices, activating switch 102 does not conduct current to load 105, but is only a command input mechanism which can, according to the invention, operate on very low current. For example, according to the invention, touch sensor input or carbon coated membrane type switch devices are preferred.

If, for example, an emergency notification function is desired, the flashlight may be designed to alternately flash on and off every second. First, the operator activates input 102 into the appropriate position to indicate such a function is desired. During the "on" segment of the flashing routine, control/reset means 201 commands current switch 202 to close and let current flow through to load 105, thereby causing, in the case of a flashlight, the bulb to illuminate. Simultaneously, control/reset means 201 uses the timing means 203 as a clock for timing. After control/reset means 201 determines one second has elapsed, control/reset means 201 instructs current switch 202 to open and interrupt the current flow through to load 105, and bulb illumination is discontinued. It is important to note that both control/reset means 201 and current switch 202 are still active and fully powered; however, current delivery is now latent with respect to load 105. When another second has elapsed, a command is passed from control/reset means 201 which again allows current to be delivered through current switch 202 to load 105, and in the case of a flashlight, bulb illumination is immediately resumed. The device continues an alternating current delivery routine until either the operator switches the setting of the activating input switch 102 to the "off" position, or until the conditions pre-programmed into the microchip, e.g. into the control/reset means 201, are satisfied and current delivery is permanently discontinued.

Similar operating routines can be employed to generate other conspicuous flashing functions such as the generation of the universal distress signal S.O.S. in Morse code. Again, such a function would require that the microchip, e.g. control/reset means 201, be pre-programmed with the appropriate code for creating such a signal, and to permit current transmission from switch 202 to load 105 in accordance with the code with the assistance of timing means 203. For example, it may be desirable to have an S.O.S. sequence wherein flashes representing each individual letter are separated by time intervals ranging from one-half (½) second to one (1) full second, while the interval between each letter in the code comprises two (2) full seconds. After a certain number of repetitions of the routine, again determined by the operator or as pre-programmed within the microchip, e.g. within the control/reset means 201, the signal is discontinued.

Figure 3:
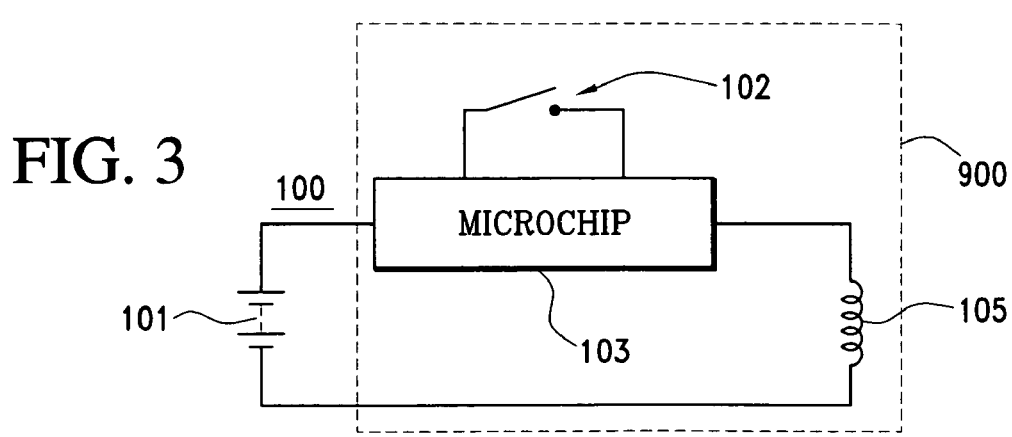
FIG. 3 is a schematic of a second type of intelligent device having a microchip controlled push button or sliding type input activation/deactivation switch according to another embodiment of the invention.

As shown in FIG. 3, it is possible to remove grounding means 104 from main circuit 100. However, it is then necessary to intermittently provide an alternative power source for microchip 103 and to create a virtual ground reference level. A suitable microchip 103 for this configuration is described in greater detail below with respect to FIGS. 8A and 8B.

Figure 4:
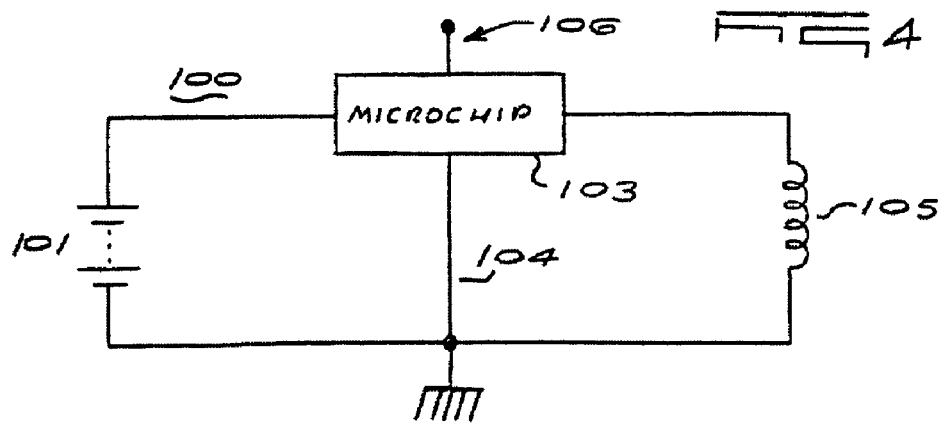
FIG. 4 is a schematic of a device having a microchip controlled touch pad or carbon coated membrane activation/deactivation switch according to a still further embodiment of the invention.

Referring now to FIG. 4, utilizing the circuits in the microchip of some embodiments of the present invention, carbon coated membrane or touch pad type switches are preferred. Carbon coated membrane switches and touch pad switches have many advantages over conventional high current switches, such as those currently used in flashlights. According to the present invention, carbon coated membrane type switches, low current type switches, and touch pad type switches can be used which may be smaller, less costly, easier to seal, and less vulnerable to corrosion and oxidation than conventional switches which also transfer energy or current to the load. Moreover, according to one embodiment of the present invention, carbon coated membrane type switches, touch pad switches, or low current type switches can be formed structurally integral with the product, for example, with the casing of a flashlight.

Figure 5:
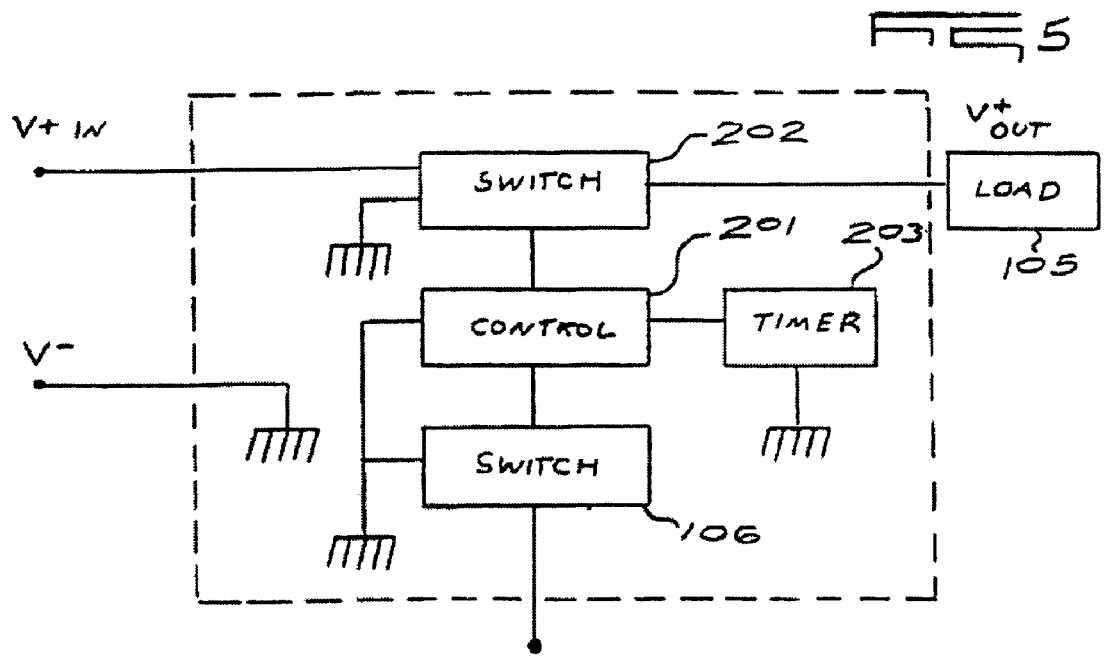
FIG. 5 is a block diagram of a microchip for use in association with a touch pad or carbon coated membrane activation/deactivation switch according to one embodiment of the invention.

A block diagram showing microchip 103 for use, in accordance with one embodiment of the present invention, in association with a carbon coated membrane, a touch pad switch, or a low current type switch 106 is now explained in greater detail in respect to FIG. 5. According to this one embodiment of the present invention, current switch 202 is powered directly by grounded power source 101. However, output of current from current switch 202 to load 105 is dependent on control/reset means 201. When an operator depresses touch pad 106, carbon coated membrane switch 106 or low current type switch 106, control/reset means 201 allows current switch 202 to flow current through to load 105. However, in more intelligent applications according to certain embodiments of the present invention, control/reset means 201 will coordinate, based on clock and/or timing means 203, to execute timing routines similar to those described above such as, but not limited to, intermittent flashing, the flashing of a conspicuous pattern such as Morse code, dimming functions, battery maintenance, battery strength/level, etc.

FIG. 16 is a flow diagram for a microchip 103 as shown in FIGS. 4 and 5 and provides a delayed shutoff function. The flow sequence commences at START when the power source 101 is connected to the microchip 103, as shown in FIG. 4. The sequence of operation is substantially self-explanatory and is not further elaborated herein.

Figure 6:
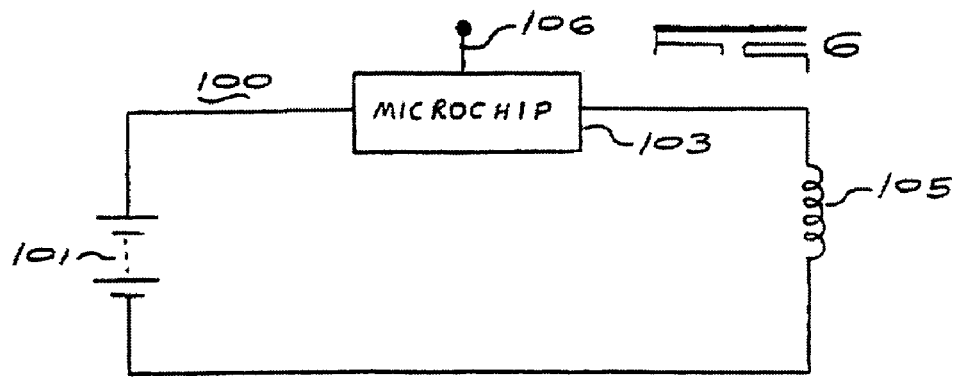
FIG. 6 is a schematic of a second type of device having a microchip controlled touch pad or carbon coated membrane activation/deactivation switch according to one embodiment of the invention.

As shown in FIG. 6, grounding means 104 can be removed from the system as a matter of design choice. A more detailed description of a suitable microchip 103 for this type of configuration is provided below with respect to FIGS. 8A and 8B.

Referring to FIG. 7, certain embodiments of the present invention also provide for a battery having a microchip embedded for use in association with an electronic device. As shown, direct current is provided to microchip 103 by power source 101. When activating input switch 102 is closed, current is complete and power is transferred to load 105 at the direction of microchip 103. Microchip 103 embedded in the battery can have any number of intelligent functions pre-programmed therein, such as, for example but not limited to, battery strength monitoring, recharging, adjustment of average current through a current switch, intermittent power delivery sequences, and so on. Examples of suitable microchips 103 for this type of application are discussed below with reference to FIGS. 8A and 8B.

FIGS. 8A and 8B are block diagrams of two different further embodiments of the present invention. Microchip 803 is especially suitable for applications wherein microchip 803 is not grounded through the body of the electrical device or where a ground cannot otherwise be established because of design considerations. This embodiment is useful to provide sufficient operating power to the microchip and can be achieved by periodically opening and closing current switch 202 when activation input switch 102 is closed. For example, referring to FIG. 8A, when input switch 102 is closed but current switch 202 does not conduct (that is, the switch is open and does not allow current to flow to load 105), then voltage drop over load 105 is zero and in the case of a flashlight, no illumination is provided from the bulb. Instead, the full voltage drop is over current switch 202 and in parallel with the diode 204 and capacitor 205. Once capacitor 205 becomes fully charged, current switch 202 can close and circuit 103 will be powered by capacitor 205. When circuit 803 is adequately powered, it functions in a manner identical to the circuits described previously with respect to the functions provided by control/reset means 201 and timing means 203.

When the charging capacitor 205 starts to become depleted, control/reset means 201 will recognize this state and reopen the current switch 203, thus briefly prohibiting the flow of current to load 105, in order to remove the voltage drop from load 105 and allow capacitor 205 to recharge and begin a new cycle. In a flashlight application, the time period wherein current flow from current switch 202 is discontinued can be such that the dead period of the light is not easily or not at all detectable by the human eye. In the case of a high current usage load, such as a flashlight, it means the ratio of the capacitance of the capacitor having to power the microchip and the current consumption of the microchip, must be such that the capacitor can power the microchip for a long time relative to the charging time (202 open). This will enable the flashlight's "off" time to be short and the "on" time to be long, thus not creating a detectable or intrusive switching of the flashlight to the user.

FIG. 17 is a flow diagram for a microchip as shown in FIGS. 7 and 8 which also provides a delayed shutoff function. The flow diagram is substantially self-explanatory and the flow sequence commences at START when closure of the switch 102 takes place from an open position.

Figure 11:
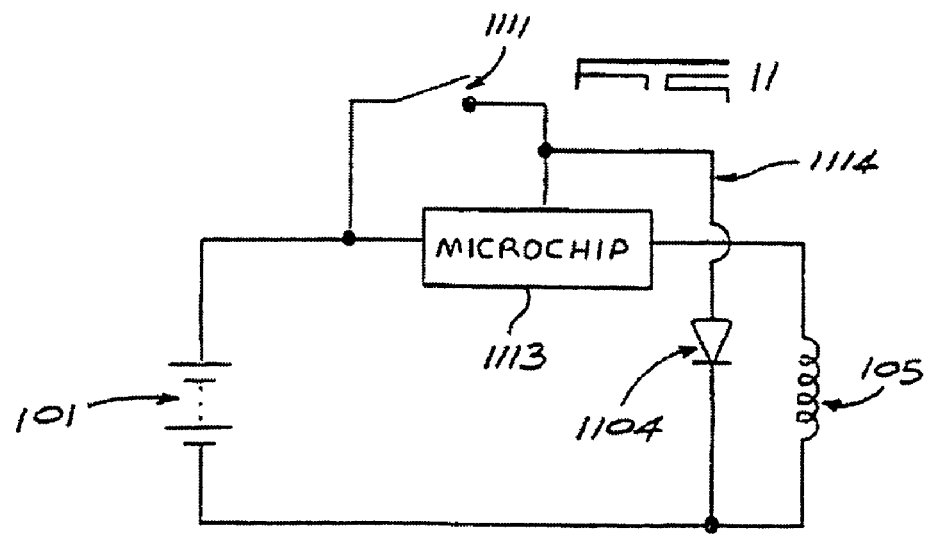
FIG. 11 is a schematic of a device having a microchip controlled switch according to one embodiment of the present invention.

According to another embodiment of the present invention, e.g. in relation to another product of low current consumption, such as a FM radio, the designer may opt for a capacitive (reservoir) device externally to the microchip (see FIG. 11). In this case, the electrical device may function for a time longer than the time required for charging the capacitor (205, 207) which is when the current switch (202) is open and not conducting current.

According to another embodiment of the present invention, an output may be provided to indicate a condition, e.g. a battery is in good or bad condition. It may also be suitable to assist in locating a device, e.g. but not limited to a flashlight, in the dark. This may be a separate output pin or may be, according to another embodiment, shared with the MMI switch input. (See FIG. 11) This output or indicator may be a LED. Referring to FIG. 11, indicator/output device 1104 may, for example, be an LED. When microchip 1113 pulls the line 1114 to high, the LED 1104 shines. LED 1104 may also shine when switch 1111 is closed by the user. However, since that is only a momentary closure, this should not create a problem.

According to a further specific embodiment of the invention, referring to FIG. 11, microchip 1113 can activate the LED 1104 for a short time, e.g. for 100 milliseconds, every 10 seconds. This indication will let potential users know the device is in a good state of functionality and will enable fast location of the device in the dark, e.g. in times of emergency. The low duty cycle will also prevent unnecessary battery depletion.

With an alternative embodiment of the present invention, FIG. 8B illustrates the charging and discharging of capacitor 207 to provide power to circuit 803, wherein the diode and capacitor structure establishes a ground reference for circuit 803.

Each of the embodiments explained with respect to FIGS. 8A and 8B are suitable for use, according to the present invention, depending upon the application. Indeed, the embodiments shown in FIGS. 8A and 8B can be directly embedded into a battery and/or can be separately constructed in another portable structure, e.g. but not limited to, in the shape of a disc, about the size of a quarter, to be inserted at the end of the battery between the output means or positive terminal of the battery and the current receiving structure of the electronic device. As described, the embodiments shown in FIGS. 8A and 8B can be utilized with the prior art high current switches currently being utilized in simple non-intelligent electronic devices, for example flashlights, radios and toys. For example, in the case of a portable simple radio without any intelligence, an automatic shut "off" may be achieved by using the intelligent battery or portable microchip of the present invention having a timing function to automatically shut off the radio after a given period of time, i.e. after the user is asleep.

The architecture of the two embodiments of the present invention shown in FIGS. 8A and 8B provide certain advantages over the simple dumb architecture in current simple electrical devices, for example, flashlights. Due to the unique design of the microchips, as shown in FIGS. 8A and 8B, after the device (into which the microchip is incorporated) is shut off the microchip remains powered for an additional period of time which allows for said microchip to thus receive additional commands, for example, a second "on" activation within a given period after a first "on" and "off" activation, may be programmed into the microchip (control/reset means) to indicate a power reduction or dimming function or any other function as desired by the designer of said device. This is accomplished by the inventive designs of the present invention without having to utilize substantial energy from what are typically small exhaustible power sources, e.g. DC batteries in the case of flashlights.

According to some embodiments of the present invention, more intelligent devices include many other useful functions pre-programmed within the microchip, e.g. in control/reset means 201 and may, e.g. be assisted by a timing means 203. Referring to FIG. 2, commands can be entered through switch 102 in several different ways. First, various time sequences of closed and open activations may represent different commands. For example, but not limited to, a single closure may instruct microchip 103 to activate current switch 202 continuously for a pre-determined length of time. Alternatively, two successive closures may instruct the microchip 103 to intermittently activate current switch 202 for a pre-determined length of time and sequence, for example, a S.O.S. sequence.

Figure 9:
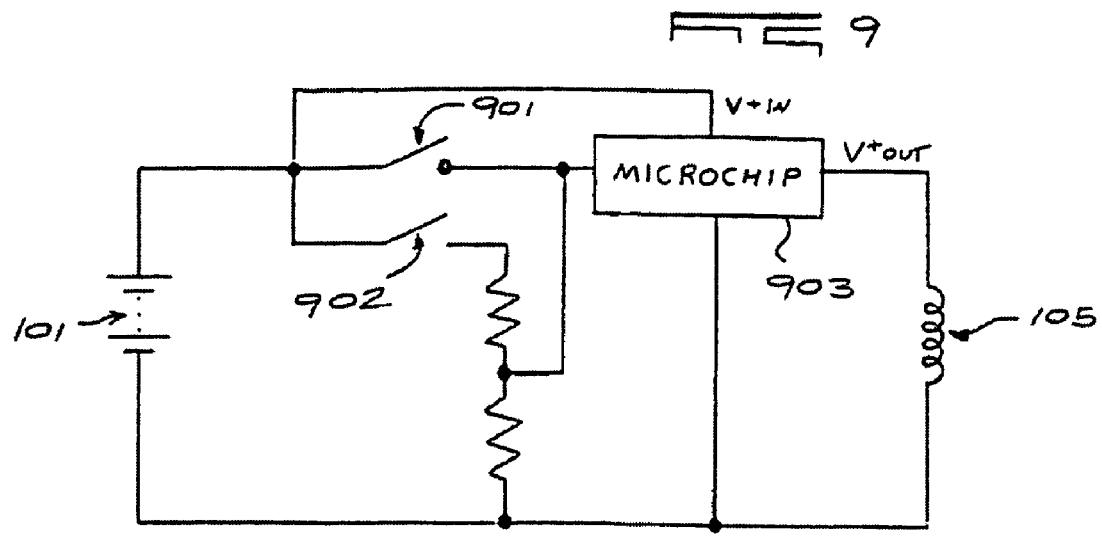
FIG. 9 is a schematic of a device having a microchip controlled switch according to one embodiment of the invention.

Secondly, referring to FIG. 9, commands may be communicated to microchip 903 through the use of various voltages recognizable by microchip 903 to represent various commands. For example, but not limited to, according to one embodiment of the present invention, it may include multiple activating switches 901 and 902 connecting different voltages to the command input structure of microchip 903.

Figure 10:
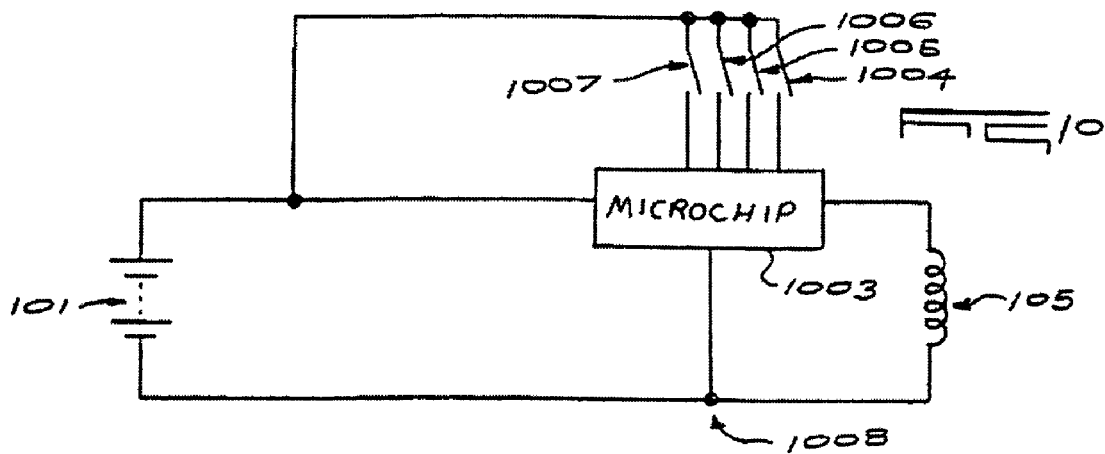
FIG. 10 is a schematic of a device having a microchip controlled switch according to one embodiment of the invention.

Thirdly, referring to FIG. 10, commands may be communicated to microchip 1103 through the use of multiple specific switches (1004, 1005, 1006, 1007) which when activated either singularly or in combination is/are recognizable by microchip 1103 as representing various different commands.

As can be seen by FIG. 9, switch 901 and 902 and in FIG. 10, switches 1004, 1005, 1006, and 1007, power or ground may be used as a command reference voltage level. For example, the switches in FIG. 10 may be connected to another ground instead of point 1008 depending on the internal structure of the microchip.

The control/reset means included in the inventive microchips of the present invention may and in some instances, depending upon the application, should in addition to the many possible user functions described above, include means for adjusting the average current over a switch and/or a means for providing a gradual "on"/"off" current flow, so that the operator does not appreciably perceive the increase and decrease in light provided by the device. These features allow for an ongoing variable level of lighting as desired by an operator, and may also lengthen the life span of the activation switch, the bulb, and the power source. Moreover, several functions can now be added to an existing device, like a flashlight, through the use of a battery having embedded therein a microchip according to the present invention.

In another embodiment of the invention, the microchip is adapted to control lighting in buildings. The normal switch on the wall that currently functions as both a power-switch and MMI can be replaced by a low current switching device like a membrane switch, touch pad or carbon coated switching device. Since very low currents are required by the MMI switch (device) that replaces the normal wall mounted (A/C) switch, it is possible to replace the normal high voltage/current (dangerous) wiring to the switch and from the switch to the lead (light), with connectivity means suitable to the new low current DC requirements. As such, in the case of normal A/C wiring (110V/220V), the dangerous wiring can now be restricted to the roof or ceiling and all switches (MMI's) can inherently be safe. This may make the expensive and regulated safety piping required for the wiring of electricity to wall switches redundant.

In a specific embodiment, the traditional wiring between the light and the wall switch is replaced by flexible current conducting tape that can be taped from the roof and down the wall to the required location. In another embodiment, the connections can be made by current conducting paint or similar substances. In both cases above, it can be painted over with normal paint to conceal it. This makes changing the location of a wall switch or the addition of another switch very easy.

The microchip according to the present invention can be located in the power fitting of the load, e.g. the light, which is controlled. The microchip has the low current (MMI) input and a power switch to block or transfer the energy to the load (light, fan, air conditioner). It reacts to the inputs received to activate or disable, or control other functions, of whatever device it is controlling.

As stated, in one specific embodiment, the microchip is located in a power fitting of a light. This is a particular example of a broad proposition namely that, in general, the microchip and for that matter the MMI switch (signal switch) can be positioned where required e.g. at a location which is remote from the load or in a housing which also contains or supports the load.

For example a courtesy light in a vehicle may include a housing in which are mounted the microchip 103, the signal switch 102 and the light source 105. This approach offers a significant advantage in terms of wiring that would otherwise be required. For example a general controller in a vehicle may be mounted in a fascia or panel (also referred to as a "dashboard") so that it is accessible by a driver to control a variety of functions including courtesy lights. If the courtesy light is controlled from the controller then it would be necessary to install wiring from the controller to the courtesy light.

This possibility is indicated somewhat schematically in FIG. 3 wherein a dotted line 900 represents a housing or mounting board or similar structure which contains, or to which is mounted, the microchip 103, the signal or MMI switch 102 which is positioned at a point at which it is easily accessible by a user and at least one load 105 which is operated, in a manner which is similar to what has been described, upon activation of the signal switch 102.

It is reiterated that the foregoing example has been described with reference to a light in a vehicle. Similar considerations can however be put into practice in respect of loads of different natures e.g. seat warmers, electric motors in toys, tooth brushes, shavers and the like.

The microchip may be adapted to contain the high current/voltage switch or control an external switching device or relay. The microchip may also, as in the other embodiments discussed, have some intelligence to control functions like dimming, delayed shut off, timed activation/deactivation, timed cycles, flashing sequences and gradual on/off switching. The microchip may also be adopted, as in a specific flashlight embodiment discussed, to provide a location/emergency signal for lighting/flashing an LED.

FIG. 12 shows a flashlight 1200 with a housing 1202, batteries 1204, a bulb 1206, a reflector and lens 1208, a switch 1210 and a microchip 1212. The flashlight has a conventional appearance but its operation is based on the microchip 1212 controlling the operation of the switch 1210, as described hereinbefore.

FIG. 13 illustrates that a battery 1300 with positive and negative terminals 1302 and 1304 respectively, and of substantially conventional shape and size, can be fabricated with an integral microchip 1306, of the type described hereinbefore. Alternatively the microchip can be mounted to the battery, for example by being inserted into a preformed cavity. As the microchip is inserted into the cavity it makes contact with the positive and negative terminals on the battery. The microchip also carries external terminals so that when the battery is inserted into an appliance (not shown) it makes direct contact with corresponding terminals on the appliance so that the microchip is automatically connected in circuit.

The power input 101 in FIG. 14 may be DC (e.g. 12V) as is commonly used for some lights or A/C (110V or 240V). The device shown as 1403 may be monolithic or be a multichip unit having a relay (solid state or mechanical), a regulator (e.g.: 110 AC volt to 12V DC) and a microchip as discussed in this application.

In a specific embodiment, Ic pin 1406 can normally be high and a closure of input means 1402, e.g. any of the low current switching devices described above, can be detected as Ic pin 1405 also goes too high. To flash the LED 1404 the microchip will reverse the polarities so that Ic pin 1405 becomes high with regards to Ic pin 1406. During this time, it may not be possible to monitor the closure of the input 1402 switch and the LED 1404 may not shine should the input 1402 be closed. In another embodiment, microchip 1403 is able to detect closure of input 1402 before reversing the voltage polarity as discussed and if it detects closure, it does not proceed with reversing the polarity.

Reference 1407 denotes an MMI wall unit, and reference 1408 denotes a high voltage roof unit.

Figure 2:
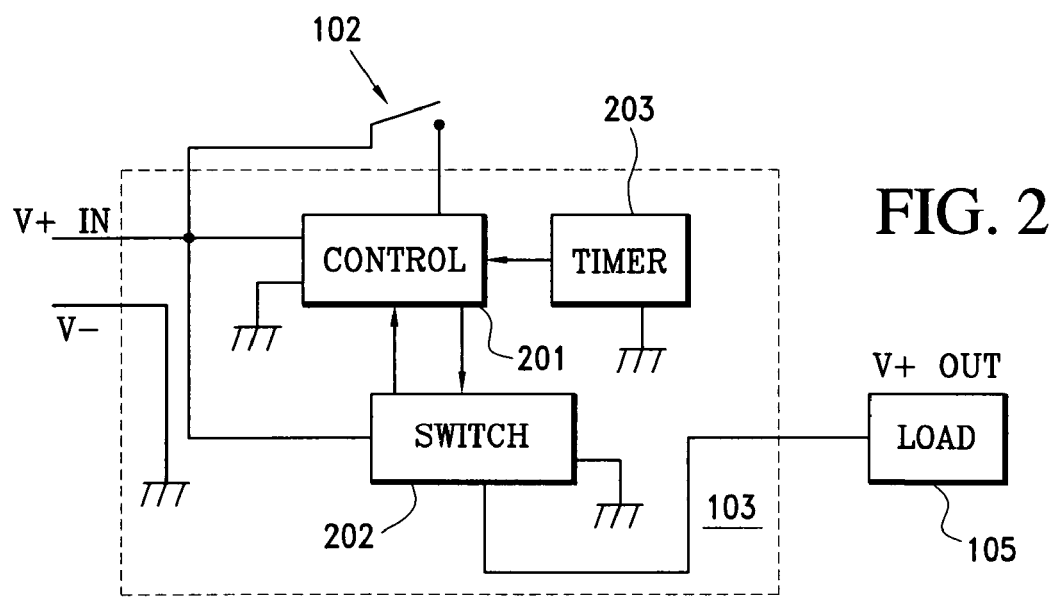
FIG. 2 is a block diagram of a microchip for use in association with a push button or sliding input activation/deactivation switch according to one embodiment of the invention.

In FIG. 15, microchip 1503 does not contain a current switch (e.g. switch 102) as shown in FIG. 2. However, if desired the regulator and relay can be integrated into a single monolithic microchip 1503. In case of a 12V (DC) local voltage this may be done in any event unless the current/power considerations is too high to make it practical.

In another embodiment, the microchips 1403 and 1503 are adapted to receive commands not only via the MMI input but also over the load power (electricity) wiring. This would allow a central controller to send out various commands to various power points, controlled by a microchip according to this invention, by using address information of specific microchips or using global (to all) commands.

If the microchip, MMI switch and load are close together e.g. integrated into a single housing or mounted on a common board or in close proximity to one another, then further benefits flow when a command, which contains at least an address field, is used. A complex command, which typically is a command which includes an address and an instruction, can be transmitted to a microchip on a single input line or, in some embodiments, over a power supply line which leads to the microchip. Referring again to the example in which a roof mounted courtesy light in a vehicle has a light source and an MMI switch in close proximity to each other, a single non-energy transferring signal wire can be routed from a general controller in the vehicle to the microchip. The controller could be used for other functions, within the vehicle, such as for controlling aspects of the engine, air conditioning, radio and the like. Multiple commands can then be transferred in a digital format over the signal wire or over the power lines, as the case may be, to the microchip and the microchip can then perform functions like gradual dimming, delayed shut-off, fade on, fade off, and the like. The microchip remains responsive to user commands received via the MMI switch (if still employed).

As the complex command includes address information it is possible to address a single microchip 103 selected from a plurality of microchips, or to address a group of microchips with a single command (i.e. a global or broadcast command) which includes appropriate address data. For example a single command, in a given set of circumstances, could be used to operate multiple courtesy lights plus floor lights in a vehicle whereas, in a different set of circumstances, it would be possible to address a single courtesy light selected from a plurality of possible courtesy lights.

FIG. 28 illustrates a system 700 of the aforementioned kind which includes a general controller 702 connected via a single line 704 to a plurality of microchips 103A, 103B . . . 103N each of which controls a respective load or loads 105A, 105B . . . 105N. Particular information e.g. control signals can be sent to the various microchips in the form of a complex signal, as has been indicated, from the controller 702 over the line 704 or the signal could be transmitted over power lines 706 also connected to the battery 101. The individual microchips can also be selectively addressed on a desired basis as opposed to the broadcast or global approach referred to. In this type of system each microchip has unique address data embedded in it and the controller 702 is selectively enabled via inputs 708 to generate a chosen address or addresses and a chosen control signal.

Referring again to FIG. 1, and this being done purely for the sake of example, the microchip 103 is activated by sliding or activating a switch 102. It is apparent that different switches can be provided for different functions of the microchip. However, in order to enhance the user-friendliness of the device, a single switch may be capable of controlling different functions of an appliance such as a flashlight to which the microchip is mounted.

Assume for the sake of example that the switch 102 is used to turn the microchip on in the sense that a flashlight is turned on. A switch 110 may then be used at any time to turn the flashlight off, by appropriately controlling operation of the microchip. This is a conventional approach to controlling operation of the microchip. As an alternative the operation of the switch 102 can be sensed by means of a timing device 112. The timing device is started when the switch 102 is closed and after a short time period, say on the order of 5 seconds or less, which is measured by the timing device, the mode or function of the switch 102 changes so that, upon further actuation of the switch 102, the switch duplicates the function of the switch 110 which can therefore be dispensed with. Thus, initially the switch 102 functions as an on-switch while, a short period after its actuation, the switch 102 functions as an off-switch. It follows that with minor modifications to the circuitry of the microchip a single switch can exhibit multi-mode capabilities with the different modes being distinguished from each other or being exhibited on a time basis or, if necessary, on any other basis.

Multimode capabilities can for example be incorporated in a microchip wherein the function of a switch is also linked to time. In this sense the word "function" means the action which ensues or results upon the detection of the closure of the switch. For example a single switch may, from an off state of a flashlight, enable (a) the switching on of the flashlight and (b) the selection of one of a number of various modes like dimming level, flashing rate/sequence etc. when the switch is closed a number of times.

If however a certain time is allowed to pass (say five seconds) without any further closure of the switch taking place (indicating a mode has been selected), the function resulting from the next closure may be changed. Thus instead of selecting another mode, the closure may be interpreted as an "off" command.

In other words a sequence of switch closures within five seconds of each other will continue to step the microchip through a number of predefined modes. However should at any stage a time of more than five seconds elapse between consecutive presses or closures of the switch then the next switch operation will switch the flashlight off rather than stepping the microchip to another mode.

Clearly these characteristics are not confined to the use of the chip with a flashlight for the chip can be used with other applications to vary the mode of operation thereof in an analogous way. Thus, for the flashlight, the function of the switch will affect the operation of the flashlight in a manner which is dependent on the time period between successive actuations of the switch. More generally, in any electrical device which is controlled by means of the microchip the operation of the device will be regulated by the function which is exhibited by a switch which is in communication with the microchip. The switch function in turn is dependent on the duration of a time period between successive operations of the switch.

Other modes can also be exhibited by a single switch. For example, depending on requirement, a switch can be used for on and off operation, for initiating the transmission of an emergency signal, for initiating the gradual dimming of a flashlight or the like. The scope of the invention is not limited in this regard.

Figure 18:
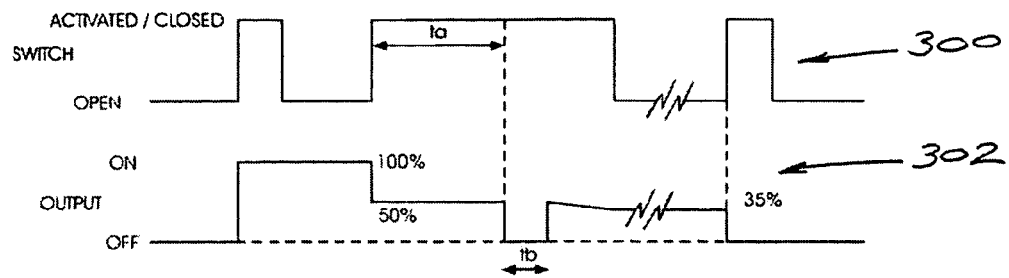
FIG. 18 depicts a possible switching cycle and a voltage or current wave form arising from the use of the switch.
Figure 19:
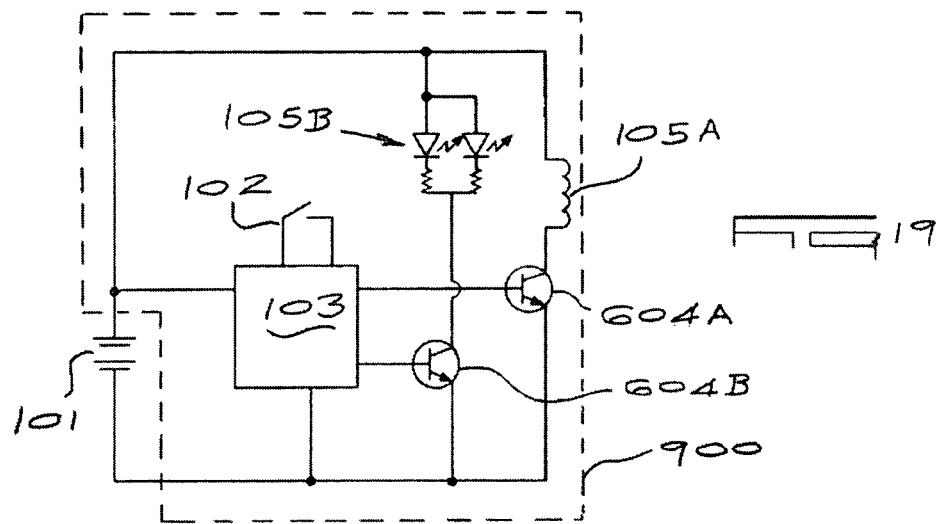
FIG. 19 shows a circuit which includes a switch of the invention used for controlling the operation of one or more loads selected from a plurality of possible loads.
Figure 20:
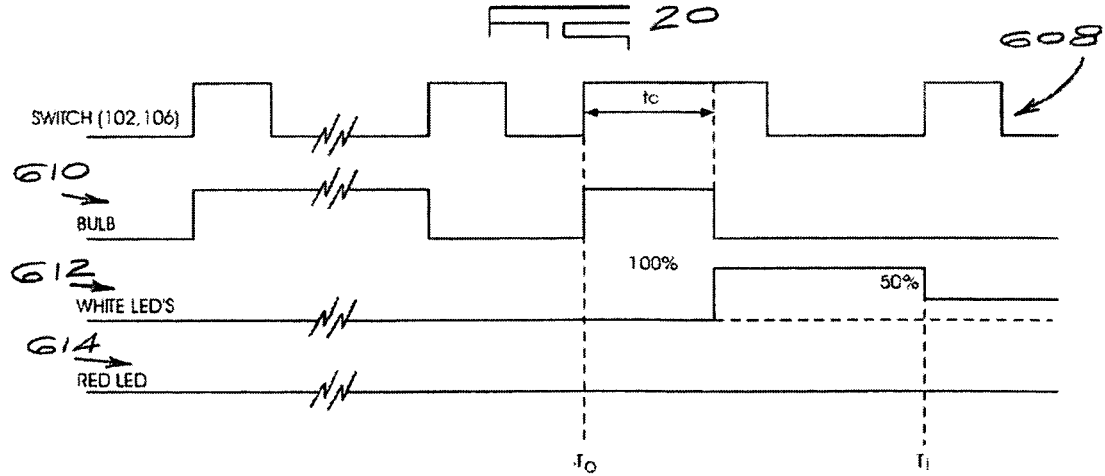
FIG. 20 shows a switching cycle and resulting waveforms of voltage or current applied to three loads.

FIGS. 18 to 20 relate to different examples of the invention used for achieving different load control functions over one or more loads. It is to be understood that in any of the examples given herein a description which may relate to a particular load type such as a light source can relate, with equal effectiveness, with differences, which may arise, which can be resolved with ease by a person skilled in the art, to other products such as heating elements, motors, microwaves or products with an electrically powered load.

The invention may be used in respect of a light, which may be one of a plurality of lights and it may be present in vehicle lighting, portable lighting products such as flashlights, flashclips, dome lights, touch lights and the like. Also, the light may be a building light in the interior or exterior of a building. The load may alternatively be a load such as a heater, seat warmer, an electric motor for a toy, a toothbrush, a shaver and a fan or for an item or mechanism such as a control system used for controlling fluid flow through a valve, tap or faucet or similar mechanism. The scope of the invention is not limited in any way in this regard.

It is further to be understood that although various specific examples are given herein, generally with reference to a particular drawing or drawings, it is possible to make use of features described in connection with one example of the invention in conjunction with features described in connection with a different example of the invention to arrive at further implementations or variations of the invention.

FIG. 18 illustrates a switching cycle 300 and a resulting voltage, current or power waveform 302 which arises from actuating an electronic switching device according to the invention in accordance with a low current activation/deactivation interface (i.e. a very low current switch) to the power switching device. The circuit may for example be of the general type shown in FIG. 3 or FIG. 6.

Assume, for example, that the switch 102 in FIG. 3 is operated with consecutive presses within a certain period of time of each other—say within a time interval T where 20 ms<T<1.5 sec. The microchip 103 then steps through preselected modes wherein the power output to the load 105, from the battery 101, may be as follows:

first press of switch: power output=100%;
second press of switch: power output=50%;
third press of switch: power output=25% and power is optionally applied in a pulse mode e.g. using pulse width modulation (PWM) techniques which, if the load 105 is a light, may cause the light to flash, or constant current techniques may be employed i.e. power can be supplied at a constant predetermined level of the maximum power output, to the load.

If the switch 102 is kept activated, or is pressed within a time which is less than 20 ms (i.e. if the switch is operated outside the aforementioned time relationship) then the microchip 103 may be programmed to give an indication of a different selected mode of operation and, for example, can output an indication (e.g. an off pulse of duration tb to the load 105 which, in the case of a flashlight, will cause a flicker) and then enter a gradual dimming mode or gradual power reduction mode. In this gradual dimming mode the power applied to the load will be gradually reduced for as long as the switch is kept activated. This is depicted in the lower waveform 302 in FIG. 18.

If the switch 102 is opened, i.e. deactivated, the dimming process is brought to a halt and the power or current supplied to the load is maintained at that level.

In a particular embodiment the aforementioned process of operation may occur during the selection of any mode. For example the user may step to the 50% power level as prescribed (in the aforementioned example by pressing the switch 102 twice), and then keep the switch activated to enter the gradual dimming or current reduction mode. The gradual dimming may be stopped at a predefined minimum power output eg. 10% or be continued to zero power output. It is also possible once the minimum output or zero output has been reached to reverse the cycle and gradually increase the power output to the load to its initial level in a cyclical fashion. This mode of operation may be repeated.

The operation of the electronic switching device of the invention, in the manner which has been described in connection with FIG. 18 and FIG. 3, can be implemented using any other of the physical embodiments of the invention and is specifically suited to use where the load 105 is a light, for example in an automotive interior, in a portable lighting product such as a flashlight, flashclip, dome light or the like, or in a building light, whether interior or exterior. This type of technique or operation can however be extended to other applications including controlling the operation of heaters, seat warmers in vehicles, electric motors for toys, toothbrushes, shavers, fans, and control mechanisms for regulating flow control from a tap or faucet, eg. by regulating water flow from a mixer and a mix of hot and cold water (different proportions) from mixer.

FIG. 27 illustrates a modification which can be made to the circuit of FIG. 3 or, for that matter, to any of the circuits described herein. A display 600 of any appropriate type, for example based on the use of multiple LED's of the same or different colors, is connected to the microchip 103 and is responsive to the sequential operating procedure of the switch 102. The display 600 is adapted to provide a visual indication of the mode of operation selected by the microchip. The display may for example have a bar graph which is 100% illuminated when the load 105 is fully energized, which is 50% activated when the load 105 is energized to the 50% level, and so on. This is a useful aid to a user particularly if the user is not fully familiar with the operation of the microchip or when the feedback is not as clear or immediate as in a light, for example a seat warmer will only stabilize on the selected value after a period of time.

FIG. 19 shows a circuit 602 which includes a microchip 103 according to the invention connected to a battery 101 and two loads designated 105A and 105B respectively. Each load, in this example, is connected in series to a respective power switch in the form of a transistor switch 604A and 604B respectively. These switches in turn are controlled by the microchip.

The microchip 103 is programmed so that, in response to a particular sequence of operations or activations of the switch 102, either of the loads 105A and 105B or both loads, are connected to the power source 101. This is in place of, or in addition to, controlling the power output by the battery 101 to the selected load or loads.

The microchip can be responsive to the timing between operations of the switch 102 to select the load which is to be energized. In a specific embodiment the microchip 103, upon receiving an activation command from an off state (i.e. when the switch 102 is first actuated), can activate either a default load or the load that was active before receiving the last "switch off" command. Thereafter, upon successive activations of the switch 102, the selected load can be activated in various pre-programmed modes which may be similar to what has been described in connection with FIG. 18. Of course, to achieve a successive activation the switch must first be released or deactivated. FIG. 19 also illustrates the possibility of including the components of the switch, excluding the power supply, in a housing, or of mounting the components to a common board, 900 indicated in dotted outline.

FIG. 20 illustrates a cycle 608 of successive operations of an activating switch 102 and resulting waveforms designated 610, 612 and 614 respectively power or current output to different loads. In this instance the product includes three different loads namely a bulb 105A and one or more white LED's 105B see FIG. 19) and a red LED (not shown in FIG. 19 but which can be connected in a similar way to the circuit as the loads 105A and 105B). The first load to be activated upon receiving an activation command from the signal switch 102 is the bulb 105A. The bulb is energized until a subsequent operation of the switch 102. The bulb is then the default load and automatically comes on when the switch 102 is again activated. This second activation is at a time To in FIG. 20. If the switch 102 is kept actuated for a period in excess of a minimum period tc (eg. 2 seconds) the microchip 103 interprets this as a command to perform a load step function and the white LED's (the load 105B) are selected. Upon a subsequent operation of the switch 102 the power output to the white LED's is reduced to 50%, at time T1. If the signal switch 102 were to be kept actuated for another minimum period, that may be the same, shorter or longer than tc, the load would be stepped again to a next load e.g. the red LED referred to.

The loads may be individually or collectively selected one after the other or the load may be randomly selected until the signal switch activation is stopped at which the time the load which is active remains selected.

Any load may be activated in a default mode which is specific to such load, or in its previously used mode, or in a general default mode, or in the mode of a previous load i.e. before selecting the new load.

When the load is turned off, details of the load which was active at that time may be saved in the microchip so that, upon reactivation, that load is selected at the same power level which applied previously.

Each load may have a specific set of modes associated with it. For example a first load may flash each time it is activated while a second load may shut off automatically to conserve power after a certain period of time has passed eg. one hour, while a third load may be permanently activated. Thus, the switch 102 may initially be employed to select a load and thereafter, according to the nature of the load which is selected, the power supplied to the load or the manner of operating the load will depend on a sequence of operations of the switch 102 with the same sequence of operations of the switch having a different effect on the operation of a different load.

The control switch 102, or any equivalent switch described hereinbefore, functions at a very low current signal using touch pads 106 or carbon coated membrane type switches. The invention is intended to extend to the provision of a low current control switch, i.e. activating/deactivating device, in a housing which makes it suitable for use in specific applications such as automotive interior lighting, lighting in a glove box, lighting in an engine compartment or in a trunk, or the like. The touch pad 106 may be of capacitive nature that may operate without physical contact or with contact to a non-conducting type material like plastic or PVC i.e. a proximity capacitive sensor which is activated by proximity effects as opposed to the making or breaking of an electrical contact. Other proximity switches may also be used. A switch of this kind should preferably be of low cost, reliable, robust, easy to install and require less precision during installation.

FIGS. 21 to 26 illustrate different types of switches which can meet these requirements. In general terms each switch includes a resiliently deformable body or component and, upon movement of such body or component, an electrical contact which is responsive to such movement is made or broken.

FIG. 21 show a switch 620 which is made from a suitable resilient or compressible material such as rubber or an equivalent plastics material and which includes a body 622 with a grommet or head 624 and a hollow interior 626. Contacts 628 and 630 are secured to opposing surfaces of the body and face each other across the hollow interior 626. Leads 632 and 634 are connected respectively to the contacts 628 and 630.

FIG. 21 illustrates a body part 636 of a vehicle in which is formed an hole 638. The grommet 624 can be compressed and then forced into position in the hole 638. The body 622 of the switch can then function as a shock absorbing stopper or anti-vibration device similar to stops used, for example, in trunk lid or hood or door in a vehicle.

The resilience of the material from which the body 622 is made is such that it normally expands to the shape and form shown in FIG. 21 with the contacts 628 and 630 apart. If the body is placed under compression, for example by closing a door or lid, the contacts are forced into electrical engagement with each other and this is interpreted by a microchip 103 as an activating signal.

The contacts 628 and 630 thus, in function, are equivalent to a switch 102 of the kind which has been described hereinbefore.

FIG. 22 illustrates a switch 620A of an alternative construction wherein a resilient body 622A has one or more contacts 628A on an external surface opposing corresponding contacts 630A on a body part 636A. Leads 632A and 634A are connected to the contacts 628A and 630A respectively.

The body 622A is positioned so that upon closure or opening of a door or lid or other movable device, for example in a vehicle, the contacts 628A and 630A are closed whereas reverse movement of the door or lid causes the electrical connection between the contacts to be opened.

FIG. 23 illustrates a switching arrangement 620B which makes use of an elongate tubular body 622B of a suitable compound shape which corresponds, for example, to the shape of a weather or sealing strip used between a doorframe and a door on a vehicle. Contacts 628B and 630B are provided on opposing inner surfaces of the body facing each other across an interior volume 626B. The contacts may extend continuously along the interior surfaces of the body and, for example, may be applied by means of an extrusion or similar process during manufacture of the body 622B. Leads 632B and 634B are connected to the contacts. In this example, in use of the switch, force is exerted to the body in the direction of an arrow 650, typically when a door is closed. The force causes the contacts 628B and 630B to be electrically connected and an activating signal is then applied to a corresponding microchip 103 in the manner which has been described hereinbefore.

FIG. 24 shows a switch 620C with a U-shaped body 622C and a fixing formation 624C. A contact 628C on an inner surface of a U-shaped interior volume 626C opposes a contact 630C on a panel 636C of a vehicle, not shown. Leads 632C and 634C extend to the contacts 628C and 630C respectively. A force is applied to the body 622C in the direction of an arrow 652 in order to cause the contacts into electrical connection with each other and, when the force is released, the body expands under its inherent resilience and breaks the connection.

In the switches shown in FIGS. 21 to 24 electrical connections between the opposing contact pairs are usually made when the resilient body is placed under compression and interrupted when the resilient body is allowed to expand. FIG. 25 shows a switch 620D with opposing U-shaped contacts 628D and 630D which are on opposing inner surfaces of a resilient body 622D and which contact each other when the body is not deformed. Electrical leads 632D and 634D are connected to the contacts in the body which is mounted by means of a grommet formation 624D to a hole 638D in a body part 636D. If compressive force is applied to the body in the direction of an arrow 656 the interior of the body "opens up" in a lateral sense and the contact pairs 628D and 630D are moved apart. This configuration is shown in FIG. 26 which illustrates how a projection 662 moves between the contacts 628D and 630D and the electrical connection which otherwise exists between the contacts is broken.

The contacts which are embodied in the switches shown in FIGS. 21 to 26 are preferably sealed or in a sealed chamber to prevent dirt or other contamination of the contact surfaces. Alternatively or additionally the contacts should be designed so that they exert a self-cleaning action when operated.

The various switches shown in FIGS. 21 to 26 have contact pins which are brought into electrical engagement with each other by movement of a housing or enclosure in or on which the contacts are mounted. In some cases one contact may be directly connected to, or be part of, the body metal that inherently forms a connector and then a separate wire to that contact would not be required.

The contact pins could however function as capacitor plates so that a capacitive switching action results which is dependent on proximity effects, as opposed to a situation in which the contact pins are brought into direct electrical connection (contact) with each other. Movement of one or more of the contacts could also be detected in other low current ways using suitable sensors.

In a preferred embodiment of the invention the switch 620 may be included in or form part in a functional part of a vehicle or other installation situation such as a door handle or locking mechanism.

Figure 29:
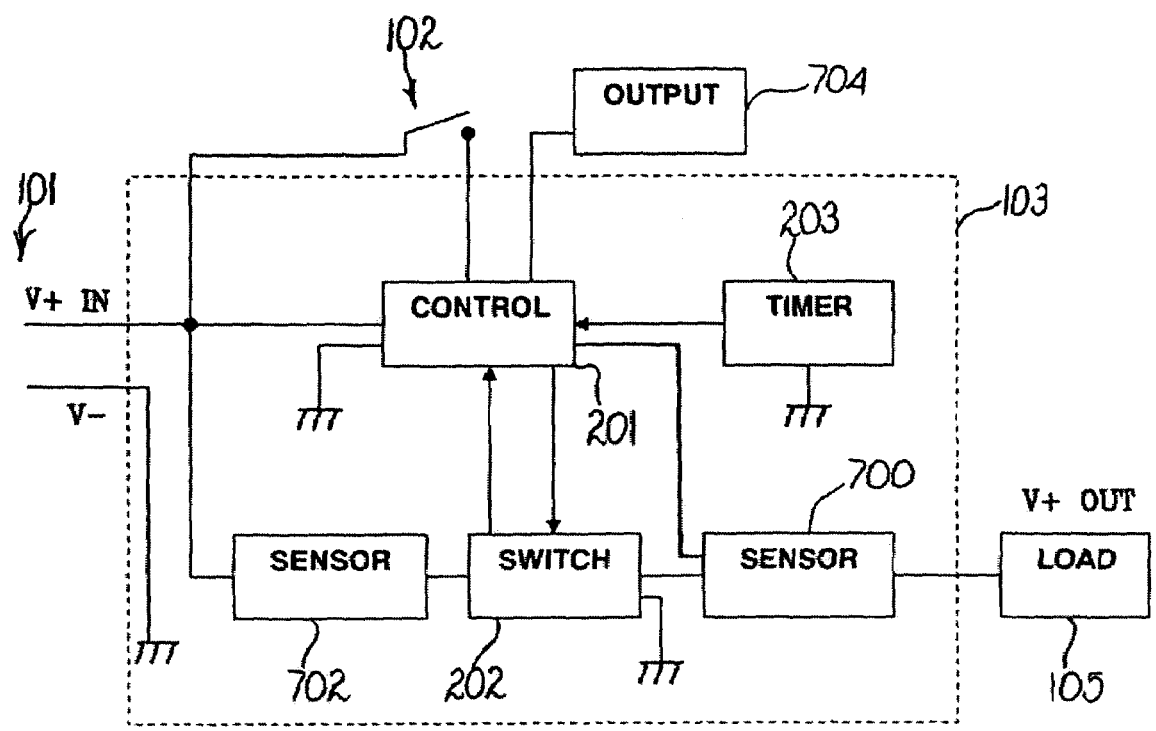
FIG. 29 illustrates a possible further feature of the invention.

FIG. 29 is a drawing which is similar in many respects to FIG. 2 and, consequently, like components bear like reference numerals. The Figure however incorporates an optional additional feature which is usable, according to requirement, in a plurality of applications but particularly with a product or load 105 which, conceivably, could be damaged if it is not correctly supplied with a predetermined current.

Use is made of a sensor 700 which is positioned to monitor the power or current applied via the switch 202 to the load 105. Although the sensor 700 can be a discrete component and hence be external to the microchip 103 it is preferred that the sensor is integrally formed with, or embodied in, the microchip.

The sensor 700 may be of any appropriate type. For example use may be made of an inductor to measure the current flowing to the load or a resistor of low value which is in the current path. The volt drop across the resistor is then indicative of the current flowing to the load. Clearly if a resistive approach is used the value of the resistor should be small to ensure that there is minimal energy wastage in the resistor. The sensor then comprises a small value resistor and a device to measure the volt drop across the resistor. Clearly the device which is used to monitor the volt drop across the resistor would, of necessity, have the capability of functioning at very low input voltages.

Depending on the requirement and application it is possible to place the sensor 700, or an additional sensor, designated 702, in the line between the supply 101 and the switch 202.

By monitoring the power or current supplied to the load, or drawn from the supply, it is possible to detect any abnormal functioning of the load, switch or power supply, as the case may be. For example if a short circuit exists in the power supply circuit or over the load then this will be detected by the appropriate sensor or sensors and the microchip can be configured, e.g. via the control/reset means 201 to take action to prevent permanent damage.

If the product (load 105) has an electromechanical switch then a short circuit will not necessarily damage anything other than a fuse (if included) or the battery supply 101. The switch 202 on the other hand which typically is a bipolar transistor or an FET device can be seriously damaged by a short circuit across the load.

The protective action which is taken by the microchip, in response to detecting an abnormal current or power supply situation, can be varied according to requirement and the invention is not limited in this respect. Typically the microchip can turn the power switch 202 off and then, in conjunction with the timer 203, intermittently turn the switch 202 on to enable the status of the short circuit condition to be monitored. If the short circuit, for whatever reason, is absent then normal operation of the load can be resumed. The turning on of the switch can be done only for a limited period of time at convenient intervals which are variable depending on the nature of the product 105. According to another variation of the invention the switch 202 is turned off immediately a short circuit condition or other abnormal power supply condition is detected and the switch 202 is only turned on after a predetermined period of time has passed or upon a next user activation e.g. via the switch 102.

An output device 704 can be connected to the microchip or be formed integrally with the microchip. In FIG. 29 the output device is shown external to the microchip 103 and is connected to an output terminal on the microchip. The output device is used to give an indication of the power or current supply situation to the load. The output device may vary according to requirement and in a simple form of the invention may be an LED or similar component which gives an indication of a short circuit condition. More complex displays can be employed to give detailed information of abnormal power supply or operating conditions. The output 704 can, alternatively or additionally, be an audible device which by means of a sound or digitally generated words indicates a power supply or operating condition. Clearly it is possible for the device 704, in general, to be used to indicate a power supply situation to the load or load operating condition, whether normal or abnormal.

The techniques described herein in connection with some embodiments of the invention can readily be adapted or incorporated for use in other embodiments of the invention.

While the preferred embodiments of the present invention have been described in detail, it will be appreciated by those of ordinary skill in the art that changes and modifications may be made to said embodiments without, however, departing from the spirit and scope of the present invention as claimed.

The invention claimed is:

1. An electronic switching device for use with a power source and at least an energy consuming load or product including:
   (a) a switch
   (b) a microchip which has an input to which the switch is connected and which is configured to influence operation of the load/product in response to at least a signal from the switch which acts as a user interface to the microchip, wherein the switch and said input do not form a serial element in a circuit that transfers power from the power source to power the load/product;
   (c) said microchip further configured to implement at least one function selected from the group consisting of:
      an automatic delayed switch-off of a function activated in response to an activation signal from the switch;
      a find-in-the-dark function by controlling an indicator, said indicator at least activated to indicate an activation of the switch; and
      a mode selection function whereby the selection of specifically a shut off function by a user, is also influenced by the time period between successive switch activation signals exceeding a predetermined minimum time; and
   (d) wherein the switch comprises at least a part that is constructed from a compressible material such that the body thereof is significantly deformed under pressure, so that it becomes thinner in the direction in which the pressure is exerted and in becoming thinner affects the operation of the switch.

2. A switching device of claim 1, configured to provide at least two of the functions in 27(c).

3. A switching device of claim 1, wherein the function selected in 27(c) is the find-in-the-dark function.

4. A switching device of claim 1, wherein the switch comprises at least a capacitive sensing touch sensor which is partially implemented in a microchip.

5. A switching device of claim 2, wherein the switch comprises at least a capacitive sensing touch sensor which is partially implemented in a microchip.

6. A switching device of claim 3, wherein the switch comprises at least a capacitive sensing touch sensor which is partially implemented in a microchip.

7. A switching device of claim 4, wherein the touch sensor provides information to the microchip about proximity events as well as physical touch events on a material surface that is not electrically connected to the microchip.

8. A switching device of claim 5, wherein the microchip controls the flow of power in response to signals from a second switch such that a change in power is gradual.

9. A switching device of claim 1, wherein the switch body is deformed to the extent that some parts that do not make contact when not under pressure make contact when under pressure or that some parts are forced to break contact under pressure, that are in contact when not under pressure.

10. A switching device of claim 4, wherein the switch body is deformed to the extent that some parts that do not make contact when not under pressure make contact when under pressure or that some parts forced to break contact under pressure, that are in contact when not under pressure.

11. A switching device of claim 7, wherein the switch body is deformed to the extent that some parts that do not make contact when not under pressure make contact when under pressure or that some parts forced to break contact under pressure, that are in contact when not under pressure.

12. A switching device of claim 4, wherein a visible indicator is activated in response to a proximity event detected by the touch sensor and a different function is activated in response to a physical touch event.

13. A switching device of claim 7, wherein a visible indicator is activated in response to a proximity event detected by the touch sensor and a different function is activated in response to a physical touch event.

14. A switching device of claim 1, wherein said device comprises multiple switches including at least touch sensor type switches and contact type switches and the touch sensor type switches can control the selection of at least a first function and the contact type switches can control the selection of at least a second, different function.

15. A switching device of claim 7, wherein said device comprises multiple switches including at least touch sensor type switches and contact type switches and the touch sensor type switches can control the selection of at least a first function and the contact type switches can control the selection of at least a second, different function.

16. The switching device of claim 1, wherein the device is configured to receive commands containing an address from a central controller or send information to a central controller.

17. The switching device of claim 7, wherein the device is configured to receive commands containing an address from a central controller or send information to a central controller.

18. The switching device of claim 12, wherein the device is configured to receive commands containing an address from a central controller or send information to a central controller.

19. A switching device of claim 12, wherein the visible indicator is configured to convey information about a level of the power source to the user.

20. A switching device of claim 12, wherein the visible indicator is configured to convey information about an operational state of the device.

21. A switching device of claim 7, wherein an electrically conductive fluid is used in the construction of the touch sensor.

22. A switching device of claim 13, wherein an electrically conductive fluid is used in the construction of the touch sensor.

23. A switching device of claim 1, wherein the microchip is configured to monitor the current from the load and to shut down the current if predetermined parameters indicating a short circuit are met.

24. A switching device of claim 7, wherein the microchip is configured to monitor the current from the load and to shut down the current if predetermined parameters indicating a short circuit are met.

* * * * *